US006268794B1

(12) United States Patent
Tzanev

(10) Patent No.: US 6,268,794 B1
(45) Date of Patent: Jul. 31, 2001

(54) INTEGRATED SECURITY, TIP-OVER, AND TURN SIGNAL SYSTEM

(75) Inventor: Oleg Tzanev, Waukesha, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 0 days.

(21) Appl. No.: 09/488,770

(22) Filed: Jan. 21, 2000

(51) Int. Cl.[7] ........................................... B60Q 1/34
(52) U.S. Cl. ................. 340/475; 340/479; 340/427; 340/440; 340/429
(58) Field of Search ........................... 340/475, 479, 340/440, 427, 429, 438, 689, 432, 425.5

(56) References Cited

U.S. PATENT DOCUMENTS

| | | | |
|---|---|---|---|
| 4,213,116 | * 7/1980 | Holtzman et al. | 340/73 |
| 4,363,022 | * 12/1982 | Manacci | 340/73 |
| 4,694,295 | * 9/1987 | Miller et al. | 340/903 |
| 4,746,206 | * 5/1988 | Kusztos et al. | 350/605 |
| 4,972,174 | * 11/1990 | Onan et al. | 340/477 |
| 5,613,571 | 3/1997 | Rank et al. | |
| 5,765,290 | * 6/1998 | Rank et al. | 33/365 |
| 5,869,907 | * 2/1999 | Marler | 307/10.1 |
| 6,011,321 | * 1/2000 | Stancu et al. | 307/10.5 |
| 6,028,507 | * 2/2000 | Banks et al. | 340/427 |
| 6,034,594 | * 3/2000 | Gray | 340/470 |

* cited by examiner

*Primary Examiner*—Jeffery Hofsass
*Assistant Examiner*—Hung Nguyen
(74) *Attorney, Agent, or Firm*—Michael Best & Friedrich LLP

(57) ABSTRACT

An intergated secruity, tip-over, and turn signal system for a motorcycle. The system provides multiple-functions with one control unit and a simplified wiring network. The system provides vehicle turn signal control including automatic turn-off of turn signal lamps at the end of a turn. The systems monitors the lateral forces acting on the motorcycle and disables the turn signal lamps, starter system, and fuel system when a tip-over condition is detected. For theft deterrence and prevention, the system allows a rider to disable the vehicle starter and ignition systems while the vehicle is parked. Tamper sensors in the system activate turn signals and an audible alarm if tampering is detected.

36 Claims, 5 Drawing Sheets

INTEGRATED SECURITY, TIP-OVER, AND TURN SIGNAL SYSTEM

The present invention relates to systems that provide turn signal control, tip-over shutdown, and security for motorcycles. More particularly, the present invention relates to a system that provides all of these functions, in a reliable manner, and with reduced wiring requirements.

A variety of accessory systems such as alarm and turn signal systems are installed on modern day motorcycles. These systems provide convenience and enhanced safety for riders of the vehicles. Tip-over systems, for example, are designed to increase safety by shutting off the motorcycle engine when the vehicle inclination reaches a dangerous level, such as might occur in an accident. As should be apparent, turn signal systems provide signaling to other vehicles and security systems provide theft deterrence.

While all of these systems are available for motorcycles, they are generally installed as separate systems, each with independent controls and wiring. The redundancy of controls and wiring creates problems. One problem is that each system takes up some of the limited space available on a motorcycle. This often results in crowding which makes installation and maintenance of the systems difficult. Another problem is that the wiring of each system is subject to physical failures such as connection faults. Since each system is independently wired, the number of possible failures multiplies with each accessory system installed.

In addition to the problems associated with accessory systems being designed as independent units, most tip-over, security, and turn signal systems do not operate satisfactorily. Present tip-over systems generally rely on pendulums and other mechanical devices to sense vehicle attitude. These types of systems are bulky, unreliable, and usually rendered non-functional when a sidecar is mounted on a motorcycle. Present turn signal systems allow riders to manually control signaling, but generally don't provide satisfactory automatic features. Present security systems generate audible alarms if vehicle tampering is sensed, but many may be bypassed by criminals with proper electronic equipment.

Accordingly, there is a need for an improved system that provides turn signal control, tip-over shutdown, and security for motorcycles.

SUMMARY OF THE INVENTION

The present invention provides a system for use in a motorcycle having turn signal lamps, turn signal switches, an engine, a starter, and an ignition system. The system includes a sensor such as an accelerometer that is designed to monitor the attitude of the motorcycle. The accelerometer is capable of detecting lateral forces acting on the vehicle. The output of the accelerometer is delivered to a processor. The processor includes a tip-over controller that analyzes the output of the accelerometer and shuts off certain vehicle systems such as the engine and turn signal lamps and disables the starter motor in the event a tip-over condition exists. Shutting off the engine and the turn signal lamps reduces spark sources, thereby reducing the possibility that fuel or other combustible liquids will ignite during a tip-over condition. Shutting off the engine also prevents continued powered movement of the rear wheel of the vehicle, which if allowed to continue during the tip over might injure the rider.

The processor is also programmed to control the motorcycle turn signal lamps and includes a turn signal controller. The turn-signal controller receives inputs from the turn signal switches and sends commands for actuation of the turn signal lamps. The turn-signal controller is operable to calculate the beginning of a turn of the vehicle and the end of a turn of the vehicle based on the output of the accelerometer and a vehicle speed signal. The turn-signal controller can turn off the turn signal lamps at the end of a turn.

The processor also includes a security controller operable to disable the vehicle engine and starter motor, detect alarm conditions, and activate alarm devices when an alarm condition exists.

These features as well as other advantages of the invention will become apparent upon consideration of the following detailed description and accompanying drawings.

DETAILED DESCRIPTION OF THE INVENTION

Figure 1:
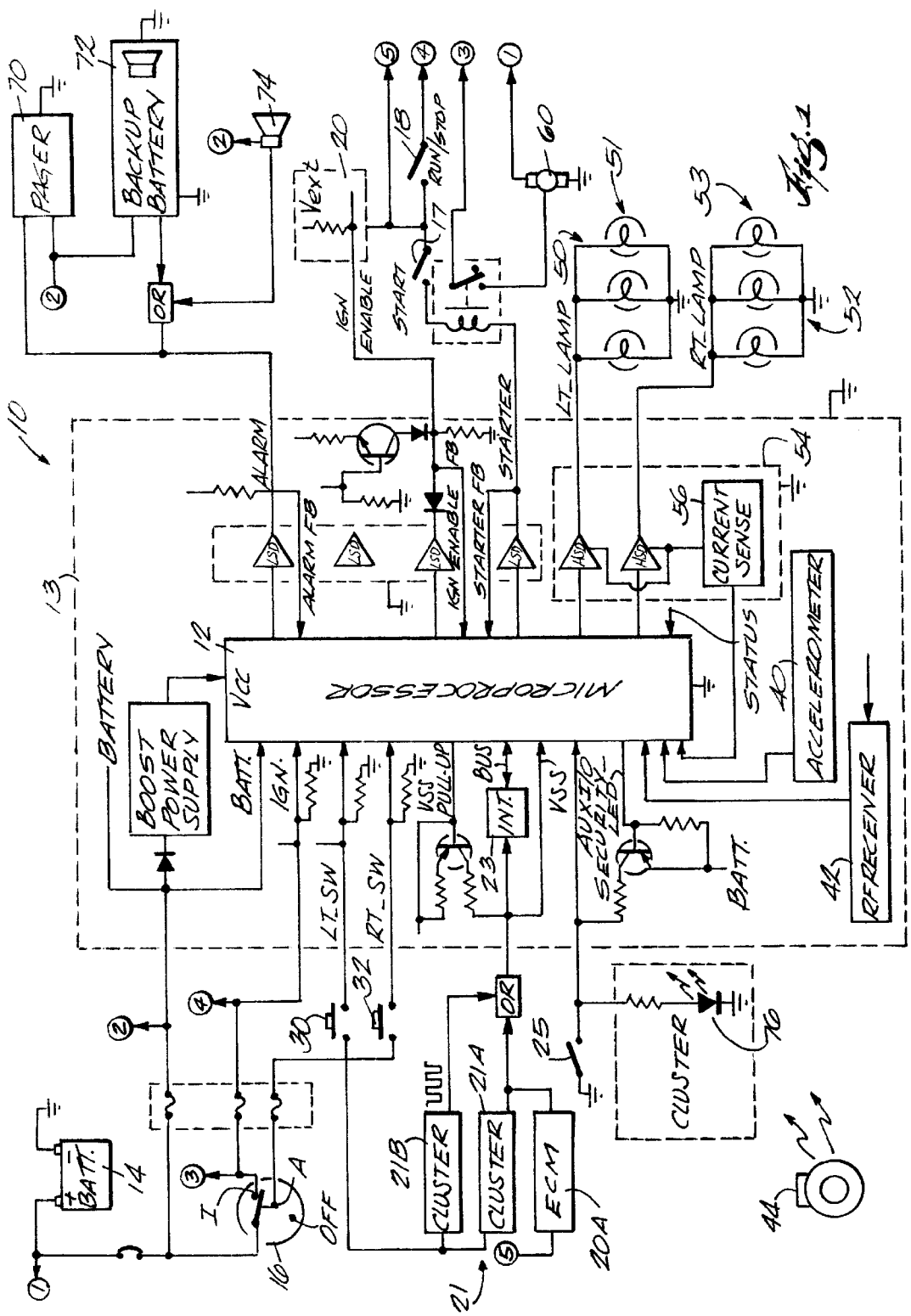
FIG. 1 is a block diagram of an electronic circuit embodying the invention.
Figure 2:
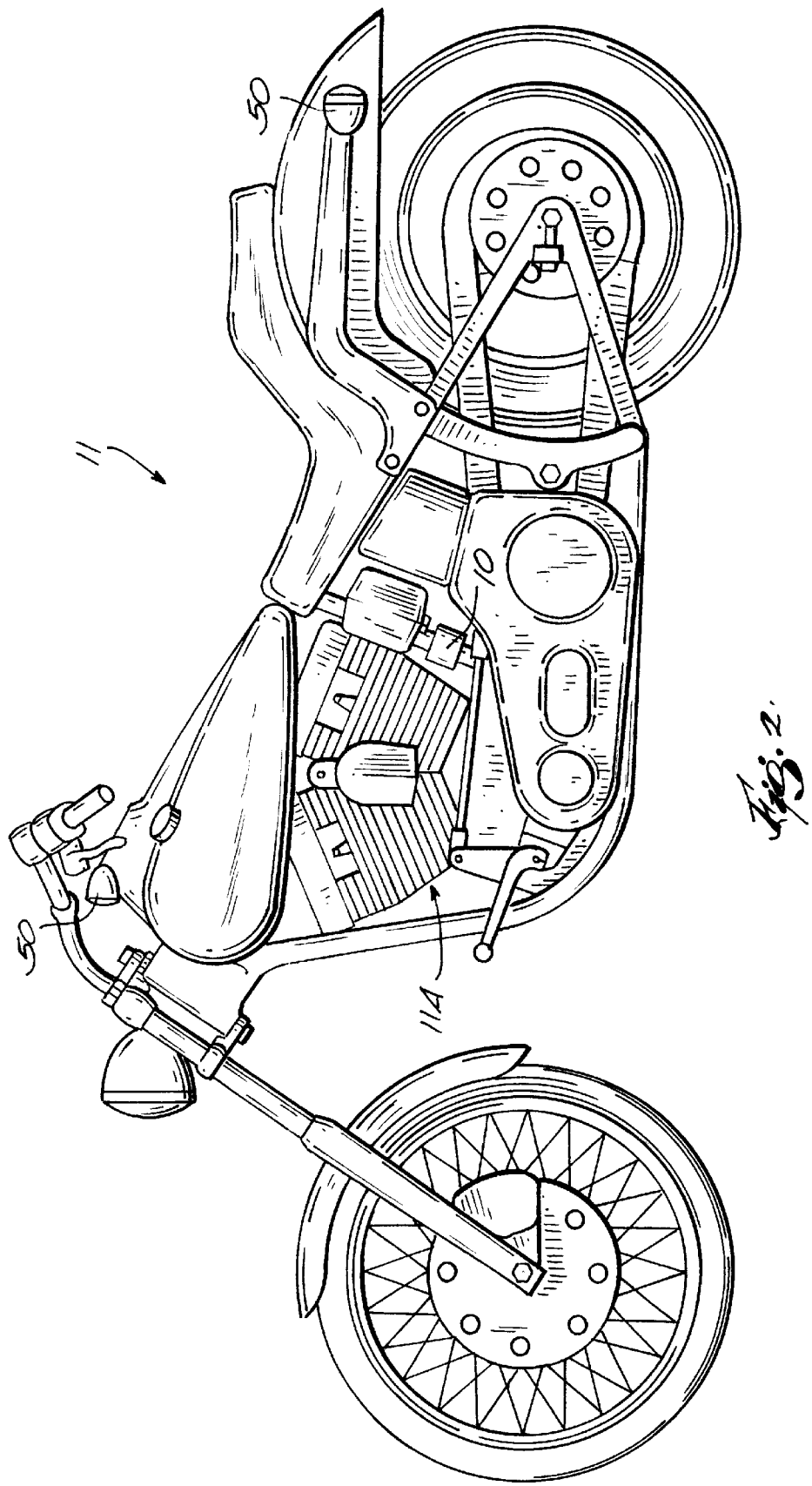
FIG. 2 is a side view of a motorcycle equipped with the circuit of FIG. 1.

An integrated security, tip-over, and turn signal system 10 is shown in FIG. 1. The system 10 includes a processor 12, which may take the form of a microprocessor or similar programmable device. In the embodiment shown, the processor is a 68HC08AS32 processor from Motorola, Inc. The system 10 is designed to be installed in a motorcycle 11 (FIG. 2) having such typical components as an engine 11A, a fuel system (not shown), and an electric system (not shown). Preferably, the system is configured to interact with motorcycles equipped with standard communication networks such as the SAE (Society of Automotive Engineering) J1850 serial data bus (sometimes referred to as "bus-equipped vehicles"). However, the system 10 may be designed to operate in motorcycles without such a system. The processor 12 is placed in a housing 13 (FIG. 1) that also contains several other components, as discussed below.

The system 10 is powered by a battery 14, which is coupled to a high voltage bias input Vcc of the processor 12. The processor 12 senses the charge condition of the battery 14 through a line BATT. An ignition switch 16 is coupled to the battery 14 and, when turned to an ignition position I, delivers an ignition output through an IGN line to the processor 12. Ignition of the vehicle occurs when the ignition switch 16 is in the ignition position I and a start switch 17 and run/stop switch 18 are closed by the vehicle rider. The ignition switch 16 also has an accessory position A and an off position OFF.

In addition to initiating ignition, the output signal on the IGN line acts as a wake-up for the processor 12, shifting it out of a storage or stand-by power mode to an operational mode. The shifting between the storage power mode and the operational mode is part of a power moding strategy implemented by the system 10. The strategy ensures that the system 10 always operates in a defined state based on information currently available to the system. It also ensures that the system transitions from one state to another based on predefined criteria.

The system 10 has an OFF mode, an ACCY mode (accessory mode), an IGN/STOP mode (ignition stop), and an IGN/RUN mode (ignition run). Each mode corresponds to different combinations of the ignition switch and the run/stop switch 18. The various modes for the system 10 are set forth in Table A.

TABLE A.

Power Mode Scheme

| run/stop switch position | Ignition Key Switch Position | | |
|---|---|---|---|
| STOP | OFF mode | ACCY mode | IGN/STOP mode |
| RUN | OFF mode | ACCY mode | IGN/RUN mode |

The ignition signal the processor 12 receives through the IGN line allows the processor to distinguish between the OFF and IGN/STOP modes. However, based on this information alone, the processor is unable to determine when the IGN/RUN mode has been selected. In addition, the processor 12 cannot distinguish between the ACCY mode and the OFF mode. Therefore, the system 10 is designed to ensure that the processor 12 receives additional input to enable it to determine the proper mode.

The processor 12 is programmed to ensure that the current power mode is indicated by the input on the IGN line until additional information is received. Either an ignition module 20, on non bus-equipped vehicles, or an engine control module ("ECM") 20A, on bus-equipped vehicles, acts as a power mode master ("PMM") that provides the additional information.

One of the advantages of the present invention is that it is designed to operate on bus-equipped vehicles and non-bus-equipped vehicles. This is important because many existing motorcycles are not bus-equipped. Accordingly, the invention may be retrofitted on older motorcycles with relative ease. Before operation of the system 10 begins, the processor 12 determines the proper vehicle type so that it may interface correctly with other modules on the vehicle. To accomplish this, the processor 12 sets the vehicle type to bus-equipped whenever it is in the OFF mode. The first time the processor 12 enters the IGN/RUN mode, the processor determines the vehicle type.

The vehicle type determination is accomplished on non-bus-equipped vehicles using a feed back input IGN_ENABLE_FB from the ignition module 20. In the embodiment shown, the IGN_ENABLE_FB signal from the module 20 is pulled high by an external voltage source $V_{ext}$ when the ignition switch 16 is in the ignition position I, and the run/stop switch 18 is in the run position. When the IGN_ENABLE_FB signal is high, the processor 12 transitions to the IGN/RUN mode and the vehicle type is set to non-bus-equipped for the remainder of the current ignition cycle. Once the processor 12 has entered the IGN/RUN mode, it remains in that mode until a transition to the OFF mode occurs. The processor 12 cannot transition back to the IGN/STOP mode.

On bus-equipped vehicles, the PMM (which in the embodiment shown takes the form of the ECM 20A) broadcasts the power mode that is presently valid and, therefore, the state of the run/stop switch 18. Once the processor 12 receives the broadcast from the PMM, it sets the vehicle type to bus-equipped for the remainder of the current ignition cycle. In the event that the additional input from the ECM 20A or ignition module 20 (as the case may be) is not received or is otherwise unacceptable to the processor 12, the processor 12 operates in a back up mode. Specifically, if the processor 12 detects a loss of the IGN input, but still detects the PMM or the IGN_ENABLE_FB input, it remains in the last known power mode. The processor exits the backup mode when the IGN input is detected again or the additional power mode indicator (the IGN_ENABLE_FB or the PMM input) is lost. On bus-equipped vehicles, if a failure of the PMM occurs (a state of health or SOH failure), but an IGN input is still present, the processor 12 remains in the last known power mode. The processor 12 exits the backup mode when input from the PMM is detected again or the IGN input is lost.

Figure 3:
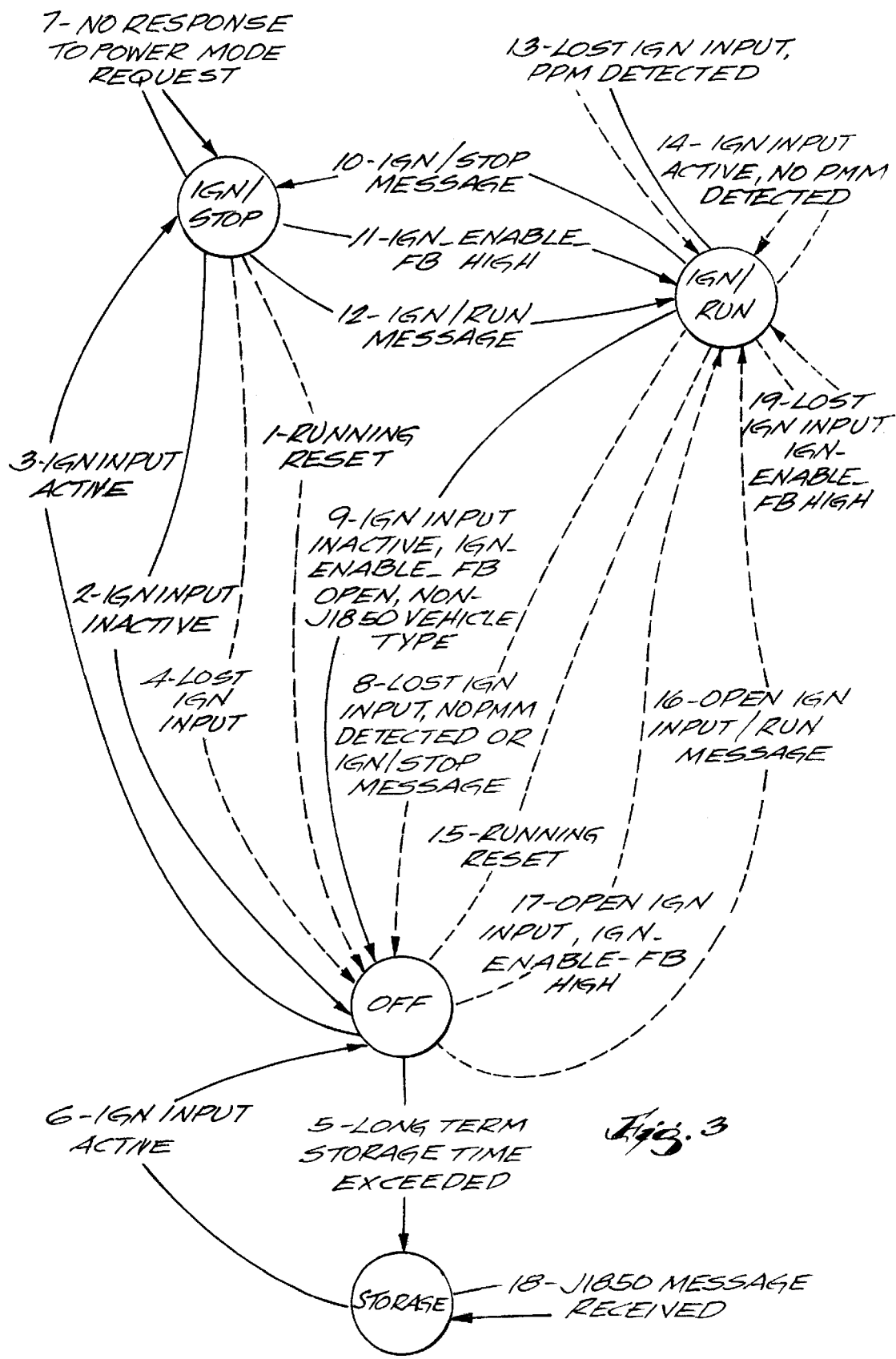
FIG. 3 is a mode state diagram of a power mode scheme embodying the invention.

The power moding strategy also provides for an optional STORAGE mode. If implemented, this mode is entered into after the processor 12 has been in the OFF mode for an extended period of time, such as 10, 30, or 60 days. When the processor 12 enters the STORAGE mode it shuts down the security controller (discussed below). Thus, the processor 12 no longer monitors for tampering or other alarm conditions. This reduces the current drain on the battery 14. How the processor 12 transitions between the IGN/STOP, IGN/RUN, OFF, and STORAGE modes is summarized in the mode state diagram of FIG. 3. As is apparent from FIG. 3, the STORAGE mode is exited when the ignition switch 16 is turned to an active position (the I or A position).

Referring again to FIG. 1, after ignition the ignition switch 16 returns to the accessory position A. In position A, power is provided to various vehicle systems, such as turn signals, as needed. Power is supplied to a cluster interface 21 which may take one of two forms; a cluster 21A or a cluster 21B, depending on the type of motorcycle in which the system 10 is installed. In a bus-equipped vehicle, the cluster interface 21 used is the bus compatible cluster 21A which receives information from various other vehicle systems such as the engine control module 20A and speed sensing systems (not shown). The information from those systems is delivered to a bus interface 23 and input to the processor 12 through a BUS line. For non-bus systems, an interface cluster 21B is used. If desired, the interface cluster 21B may be coupled to a vehicle speed sensor (not shown) and the output of the sensor delivered to the processor through line VSS.

The processor 12 may also be equipped with an auxiliary interface to receive input through an auxiliary line AUX_I/O. The auxiliary line AUX_I/O provides an interface to an external switch 25 to ground that is momentarily closed if an external sub system, such as an alarm of a security controller, discussed below, requests activity. As also discussed below, the AUX_I/O line is used to drive a security system telltale.

A left turn signal switch 30 and a right turn signal switch 32 provide input to the processor 12 through the lines LT_SW and RT_SW, respectively, when depressed by a rider. Input from these lines controls turn signal lamps and other features of the system 10, as described further herein.

The processor 12 receives additional input from an accelerometer 40. In the preferred embodiment the accelerometer is a C2EH1T model available from VTI-Hamlin. The accelerometer 40 measures lateral forces that act upon the motorcycle. The information provided by the accelerometer 40 is analyzed by the processor 12 and used to generate command signals to control various systems in the motorcycle.

The output of the accelerometer 40 is based on the movement and position of the vehicle. The position of the vehicle may be viewed as an inclination angle or lean angle of the motorcycle measured from a vertical vehicle position. In other words, an upright vehicle position is equal to a zero-degree vehicle inclination angle and a fully tipped over vehicle position is equal to a 90 degree vehicle inclination angle. The accelerometer 40 outputs a voltage that is proportional to the vertical component of the earth's gravity, as sensed by the accelerometer. Of course, centrifugal forces acting on the vehicle while it is in motion tend to counter act the gravitational forces acting on the vehicle. Thus, in steady state motion (such as when traveling around a curve at a constant speed) the output of the accelerator is zero or nearly zero. When the vehicle changes attitude or orientation, however, lateral forces acting on the vehicle are not fully cancelled by centrifugal forces acting on the vehicle. Thus, the accelerator senses such changes as they occur. Since the attitude or inclination angle of the vehicle changes relatively slowly compared to the dynamic frequency response of the accelerometer, the accelerometer 40 output is filtered to remove high frequency noise.

The accelerometer 40 is oriented so that when the vehicle is tilted to one side, a static, fully tipped over position (90°) is sensed as −1 (g) lateral force with a voltage output at a minimum level, such as about 0.833 volts. When tipped to the other side, the tipped over position is sensed at +1 (g) lateral force with a voltage output at a maximum level, such as about 4.167 volts. Based on the voltage levels given in the example above, the accelerometer 40 has a sensitivity of 1.167 volts/g.

The actual static accelerometer voltage produced by the accelerometer 40 deviates from ideal values due to manufacturing tolerances, assembly tolerances, and temperature changes. The actual voltage sensitivity is determined by the following formula:

$$V_{sens} = [V_{out}(+1\ g) - V_{out}(-1\ g)]/2$$

The actual static upright position is determined according to the formula:

$$V_{out(upright)} = [V_{out}(+1\ g) - V_{out}(-1\ g)]/2$$

The actual static vertical component of gravity, in g's, is determined according to the formula:

$$g's = (V_{out(lean)} - V_{out(upright)})/V_{sens}$$

The actual static vehicle inclination angle, in degrees is determined according to the following formula:

$$ANGLE_{deg} = \cos^{-1}(ABS(g's))$$

The voltage output of the accelerometer 40 may be used to determine when the vehicle has begun and completed a turn. As should be evident from the discussion above, when the vehicle begins a turn, lateral forces act upon the accelerometer causing it to generate an output of a predetermined amount. As the vehicle turns back to an upright position at the end of the turn, lateral forces act upon the accelerometer causing it to generate another output of another predetermined amount. If the outputs, which are preferably digital and measured in A/D counts, occur over a certain period of time, the movement is considered to be a turn by the processor 12. Determination of turn completion is discussed in greater detail below.

In addition to the input from the accelerometer 40, in an optional embodiment of the present invention, the processor 12 also receives input from a receiver 42. The receiver 42 is tuned to receive messages from a transmitter 44. As will be discussed in greater detail below, the receiver 42 and transmitter 44 are part of a security sub-system of the system 10.

As noted, the processor 12 controls activation of various vehicle systems. The processor 12 includes a turn-signal controller (implemented as software) that controls a set of left turn signal lamps 50 and a left turn indicator 51 through line LT_LAMP. The turn-signal controller also controls a set of right turn signal lamps 52 and a right turn indicator 53 through the line RT_LAMP. The sets of turn signal lamps 50 and 52 are turned on when a rider activates the left turn signal switch 30 or right turn signal switch 32, as the case may be. The rider may manually shut off the left turn signal lamps 50 by activating the left turn signal switch 30 again, while the lamps are on. The right signal lamps may be shut off in a similar fashion.

A flasher 54, which includes a current sensor 56, drives the sets of turn signal lamps 50 and 52. The current sensor 56 generates a status output that is delivered to the processor 12 on the line STATUS. The status output represents the flashing or flash rate of the activated set of lamps.

The processor 12 provides automatic shut off of the sets of turn signal lamps 50 and 52 through the turn-signal controller. The turn-signal controller is activated when an input signal on the LT_SW or RT_SW lines is present for a minimum period of time, such as 70 ms. When this occurs, the turn-signal controller counts the number of flashes of the activated set of lamps and automatically cancels or turns off the activated lamps after a certain number of flashes. In the embodiment shown, shut off occurs after 20 flashes, which is equal to approximately 12 seconds.

The basic turn signal cancellation based on time may be enhanced by accounting for changes in vehicle motion (i.e., speed and acceleration). The turn-signal controller initiates a speed-based, extended counting shut off when the absolute vehicle speed reaches a certain value or a certain change in vehicle speed occurs. The turn-signal controller receives vehicle speed information either from the BUS or VSS lines as described above, and calculates acceleration based on the difference in vehicle speed in successive speed measurements. The turn-signal controller suspends counting of flashes when the vehicle speed is less than or equal to a low speed threshold value, such as 5 mph. The turn-signal controller also suspends counting flashes when the vehicle deceleration is greater than or equal to a deceleration threshold value, such as 1 mph/sec.

Turn signal cancellation may also be accomplished based on changes in lateral forces that occur during vehicle maneuvering. The turn-signal controller constantly monitors the lateral force acting on the vehicle to determine when a turn has been started. The start of a turn is indicated by an absolute difference between the sensed lateral force and the output of the accelerometer when the vehicle is moving in a straight direction, such as 2 A/D counts (the "turn bank angle") for a certain amount of time, such as about 300 ms (the "turn bank time"). The completion of a turn is indicated by an absolute difference between the sensed bank angle and the current upright position of less than a certain predetermined amount, such as 2 A/D counts (the "turn upright angle"), for a certain period of time, such as about 500 ms (the "turn upright time"). The flash sequence of the activated lamps is terminated by the turn-signal controller a predetermined number of flashes (e.g., 2) after the turn is determined to be complete.

Turn signal cancellation based on changes in lateral force is suspended based on the speed and deceleration criteria discussed above. Specifically, cancellation of flashing may be suspended or disabled if the vehicle speed is less than a low speed threshold value, such as 6 mph. Cancellation of flashing may also be suspended if the vehicle deceleration is greater than or equal to a deceleration threshold value such as 1 mph/sec.

Turn signal cancellation based on changes in lateral forces must be modified if a sidecar is installed on the motorcycle having the system 10. When a sidecar is installed, the turn bank angle and turn bank time are increased. Specifically, they are adjusted to 10 A/D counts and about 800 ms, respectively. Modification of turn signal cancellation according to speed or acceleration, as discussed above, may be applied to sidecar installations, if desired. The processor 12 knows whether a side car is installed on the vehicle based on input from one of the turn signal lines received during a program mode (discussed below). In the embodiment described herein, the commands from the left turn signal line LT_SW indicate whether a sidecar is installed. The first transition of the left turn signal switch from the active to the inactive state is interpreted as an indication that no sidecar is installed. The next transition indicates that a sidecar is installed. A transition past two causes the pattern to repeat.

Another useful control function provided by the processor 12 is four-way flashing. If the processor is in the IGN/STOP or IGN/RUN mode, it will activate the turn signal lamps 50 and 52 when both the left turn signal switch 30 and the turn signal switch 32 are activated again simultaneously for a minimum period of time, such as 0.2 seconds. The processor 12 activates the lamps 50 and 52 for a flashing period, such as 120 minutes, or until both of the turn signal switches 30 and 32 are again activated simultaneously for the minimum period of time.

The turn signal lamps 50 and 52 are also used to provide indications of system diagnostics for short circuit to battery, short circuit to ground, or open circuit conditions. The processor 12 periodically conducts diagnostic testing on these and other conditions such as battery overcharge. For example, to test for a short circuit to battery condition, the processor 12 checks output feedback signals, such as the IGN_ENABLE_FB, to determine if a short has occurred. A short has occurred if the output feedback is high, the corresponding output signal is high, and the battery voltage is in a specified operating range, such as 9.0 volts to 15.0 volts. If a short is detected, turn signal lamps 50 and 52 are flashed. The turn signal lamps 50 and 52 are also flashed if a short circuit to ground condition is detected by the processor 12.

Testing for open circuit conditions in the turn signal lamps 50 and 52 is performed by the processor 12 each time the power mode transitions from OFF to IGN/RUN or IGN/STOP. The processor individually activates the LT_LAMP and RT_LAMP lines for an open-lamp-on time, such as about 200 ms. The processor 12 measures the lamp currents during the last portion of the open-lamp-on time (e.g., the last 25% of the open-lamp-on time). If the left and right turn signal lamp currents do not agree within a threshold amount (e.g., 30%), the processor 12 determines that an open circuit condition exists for the side with the lower current. Once an open circuit condition is detected, the lamps 50 and 52 are flashed at a high rate, such as twice the normal flashing rate, until the flashing is manually cancelled.

In addition to controlling the sets of turn signal lamps 50 and 52, the processor 12 controls a starter 60 through a STARTER line. In motorcycles lacking a network bus, the processor may also be configured to control the ignition module 20 through the IGN_ENABLE line. Control of the starter 60 and ignition module 20 (as required) is administered by a tip-over module or controller in the processor 12. The tip-over controller (preferably implemented in software) monitors the output of the accelerometer and determines whether a tip-over condition exists. For the example described herein, a tip-over condition exists if the static lean angle of the vehicle is at about 45 degrees or more (tip angle) for a period of about 700 ms (tip-over time). If a tip-over condition exists, the tip-over controller shuts off the engine by sending an engine disable message over the BUS (for bus-equipped vehicles) to the ECM 20A or by deactivating the IGN_ENABLE output to the ignition module 20 (for non-bus enabled vehicles).

Simultaneous with the engine shut down, the tip-over controller deactivates the LT_LAMP and RT_LAMP lines and any active outputs over the STARTER line. Once these disabling commands have been executed, the tip-over controller remains in a tip-over condition until the power mode transitions from OFF to IGN/STOP or IGN/RUN. The tip-over controller is disabled if a sidecar is installed on the motorcycle.

As noted above, the system 10 may include a security sub system. The security sub system includes a security controller (preferably implemented as software) installed on the processor 12. When the system 10 includes a security sub system, the processor 12 generates a command signal in response to various alarm conditions (discussed below). The command signal causes the generation of visual, audio, and other alarm indicators. In one form of the invention, the sets of turn signal lamps 50 and 52 are flashed when an alarm condition exists. Optionally, the processor may be coupled to additional alarm devices such as a pager 70, a battery backed siren 72, a standard siren 74, or a combination of these items. Commands from the processor 12 are delivered to these devices along an ALARM line.

In the preferred embodiment of the system 10, the security controller of the processor 12 is disabled until one or more transmitters 44 have been assigned to the receiver 42. Once the transmitter 44 has been assigned to the receiver 42, the security controller is activated (or armed) and deactivated (or disarmed) by command signals received from the transmitter 44. Optionally, the security controller may be designed to self-arm after a predetermined period of time (such as 30 seconds) when the system 10 enters the OFF power mode, such as occurs after the engine is shut off. This is known as passive arming.

Regardless of how the security controller is activated, once armed the security controller monitors the vehicle for disturbances indicative of tampering. These disturbances are also referred to herein as alarm conditions. The monitored alarm conditions include vehicle motion, tampering of the IGN input, tampering of the IGN_ENABLE_FB input, tampering of the AUX_I/O input, detection of a non-security telltale message on the BUS, and detection of a battery connect or reconnect. If one or more of these conditions are detected, alarm commands are delivered to the sets of signal lamps 50 and 52 and any optional alarm devices installed on the vehicle. One interesting feature of the security controller is that it does not interfere with the turn signal controller's ability to operate the turn signal lamps in a four-way flashing mode. Thus, it is possible to arm the security controller and leave the turn signal lamps flashing, when the ignition key is removed and the ignition switch 16 is locked. Leaving the motorcycle 11 in this condition may be desirable during a roadside break down.

The security controller also controls a security telltale that is operable to visually alert a rider as to the state (armed or disarmed) of the security controller. For example, the telltale may take the form of an LED 76 that receives commands from the processor 12 along a SECURITY_LED line.

Figure 4:
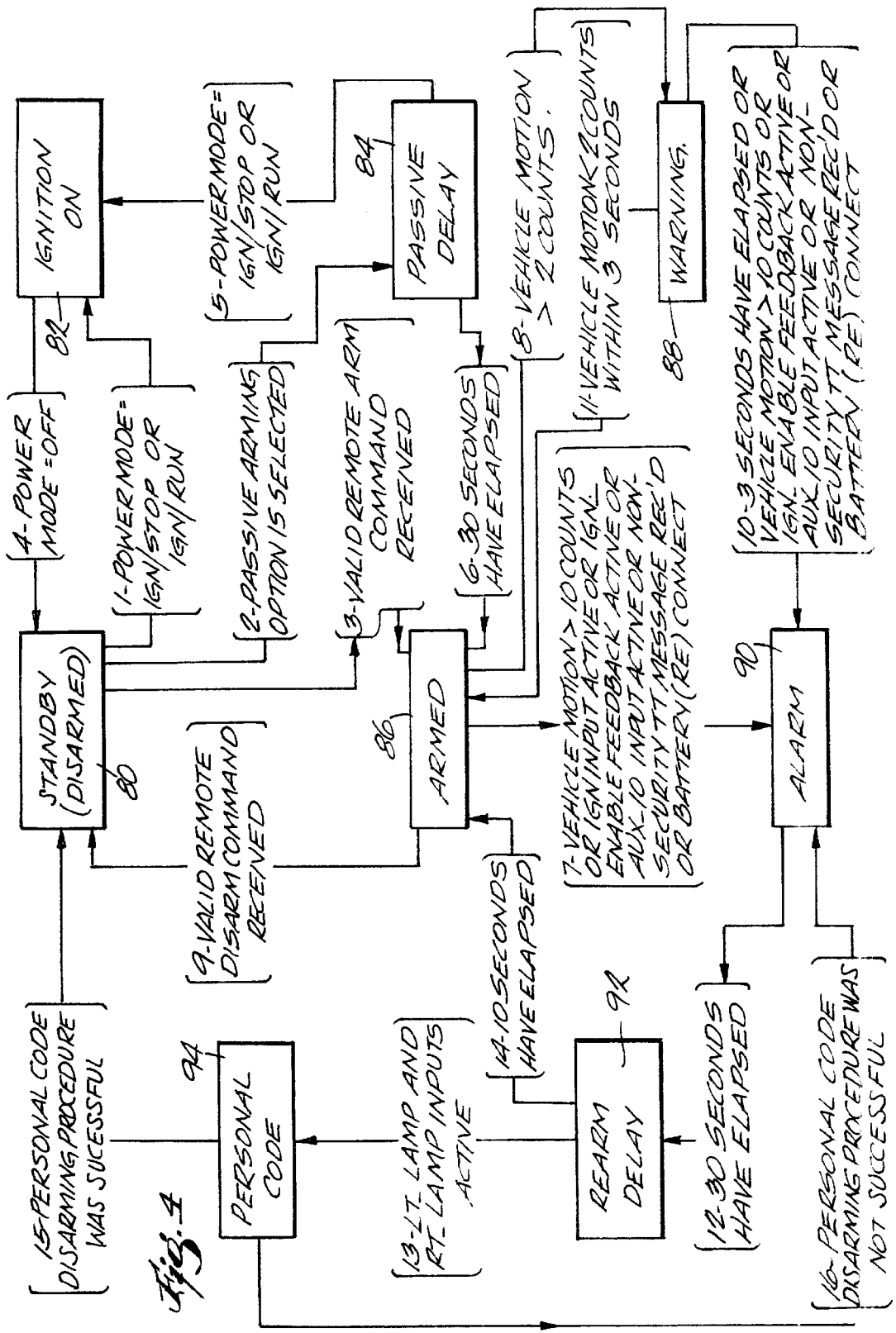
FIG. 4 is a mode state diagram of a security system embodying the invention.

The overall operation of the security controller is best understood by reference to FIG. 4 which illustrates the operation of the security controller in terms of operating states and modes. The security controller has two states: armed and disarmed. In the disarmed state, of course, the security controller does not monitor the vehicle for alarm conditions. As noted above, when the security controller is armed, it monitors the vehicle for alarm conditions. The security controller also immobilizes the vehicle when it is in the armed mode. In particular, the security controller drives the STARTER line high to disable the starter relay. The security controller also deactivates the engine controller when in the armed state. For bus-equipped vehicles, the security controller delivers a signal over the bus line to ECM 20A to disable engine operation. For non-bus-equipped vehicles the IGN_ENABLE output is driven high to deactivate the ignition module 20.

Specific operations carried out by the security controller are best understood by examining the controller's modes of operation, which include a standby mode 80, an ignition-on mode 82, a passive delay mode 84, an armed mode 86, a warning mode 88, an alarm mode 90, a rearm delay mode 92, and a personal code security mode 94.

In the standby mode 80, the security controller is disarmed and the vehicle is in the OFF power mode. The security telltale is inactive, any audible alarm is inactive, any visual alarm is inactive, the IGN_ENABLE line is inactive, and the STARTER line is inactive. The security controller remains in the standby mode 80 until one of the conditions in Table B is met.

TABLE B

| | |
|---|---|
| a | The power mode transitions to either IGN/STOP or IGN/RUN. In this case, the security controller enters the ignition-on security mode 82. |
| b. | The power mode remains in an OFF status when the passive arming option is selected. When this occurs, the security controller enters the passive delay security mode 84. |
| c. | A valid remote arm command is received from the transmitter 44. In this case, the security controller enters the armed mode 86. |
| d. | The security controller receives a vehicle security trigger alarm through the BUS. In this case, the security controller enters the alarm mode 90. |

In the ignition-on security mode 82, the security controller is disarmed and the vehicle is in the IGN/STOP or IGN/RUN power mode. In the ignition-on security mode 82, the security telltale is active for a certain period of time to ensure that the LED 76 or other light emitting device is operable. Any audible alarm is inactive, any visual alarm is inactive, the IGN-ENABLE line is active, and the STARTER line is also active. The security controller remains in the ignition-on mode 82 until one of the conditions in Table C is met.

TABLE C

| | |
|---|---|
| a. | The power mode transitions to OFF. In this case the security function enters the standby mode 80. |
| b. | The security controller receives a vehicle security trigger alarm message. In this case the security function enters the alarm mode 86. |

In the passive delay mode 84, the security controller waits for the passive arming delay time to expire (when the security controller is designed with the passive arming feature). In this mode, the security telltale is active, any audible alarm is inactive, any visual alarm is inactive, the IGN_ENABLE line is inactive, and the starter enable is inactive. The security controller remains in the passive delay mode 84 until one of the conditions in Table D is met.

TABLE D

| | |
|---|---|
| a. | The power mode transitions to either IGN/STOP or IGN/RUN. In this case the security controller enters the ignition-on mode 82. |
| b. | A valid remote armed command is received from the transmitter 44. In this case, the security controller enters the armed mode 86. |
| c. | The security controller remains in the passive delay mode 84 for greater than a predetermined delay time (such as 30 seconds). In this case, the security controller enters the armed mode 86. |

In addition to the conditions listed on Table C, the security controller will exit the passive delay mode if it receives a vehicle security trigger alarm message over the BUS. If that occurs, the security controller enters the alarm mode 90.

In the armed mode 86, the security controller is armed and monitoring the vehicle for tampering (i.e., alarm conditions). When in the armed mode 86, the security telltale is cycled for one quick flash, the audible alarm is chirped, the visual alarm flashes a predetermined number of times, the IGN_ENABLE line is inactive, and the STARTER line is inactive. The security controller remains in the armed mode 86 until one of the conditions in Table E is met.

TABLE E

| | |
|---|---|
| a. | The vehicle inclination angle departs from the initial armed inclination angle by more than about 10 counts. In this case, the security controller enters the alarm mode 90. |
| b. | The vehicle inclination angle departs from the initial armed inclination angle by more than about 2 counts. In this case, the security controller enters the warning mode 88. |
| c. | The IGN input becomes active. In this case, the security controller enters the alarm mode 90. |
| d. | The IGN_ENABLE_FB line becomes active. In this case, the security controller enters the alarm mode 90. |
| e. | The AUX_I/O input becomes active. In this case, the security controller enters the alarm mode 90. |
| f. | A non-security telltale message is received on the BUS. In this case, the security controller enters the alarm mode 90. |
| g. | A battery connect or reconnect is detected. In this case, the security controller enters the alarm mode 90. |
| h. | The security controller receives a vehicle controller trigger alarm message over the BUS. In this case, the security controller enters the alarm mode 90. |
| i. | A valid remote disarm command is received from the transmitter 44. In this case, the security controller enters the standby mode 80. |

In the warning mode 88, the security controller detects a disturbance of the vehicle which is assumed to have been caused by a potential thief and attempts to warn the potential thief prior to setting off the full alarm. When the security controller is in the warning mode 88, the security telltale is active, the visual alarm is active, the IGN_ENABLE line is inactive, and the STARTER line is inactive. The security controller remains in the warning mode 88 until one of the conditions in Table F is met.

TABLE F

| | |
|---|---|
| a. | The vehicle inclination angle returns within about 2 counts of the initial armed inclination angle in less than a predetermined period of time, such as three (3) seconds. In this case, the security controller immediately cancels the alarm and enters the armed mode 86. |
| b. | The vehicle remains at an inclination angle from the initial armed inclination angle for a predetermined period, such as three (3) seconds. In this case, the security controller enters the alarm mode 90. |
| c. | The vehicle inclination angle departs from the initial armed angle by more than about 10 counts. In this case, the security function enters the alarm mode 90. |
| d. | The IGN input becomes active. In this case, the security controller enters the alarm mode 90. |
| e. | The IGN_ENABLE_FB line becomes active. In this case, the |

TABLE F-continued security controller enters the alarm mode 90.
f. The AUX_I/O input becomes active, causing the security controller to enter the alarm mode 90.
g. A non-security telltale message is received on the BUS. In this case, the security controller enters the alarm mode 90.
h. A battery connect or reconnect is detected, causing the security controller to enter the alarm mode 90.
i. A valid remote arm command is received from the transmitter 44. In this case, the security controller cancels the alarm and enters the armed mode 86.
j. A valid remote disarm command is received from the transmitter 44. In this case, the security controller cancels the alarm and enters the standby mode 80.

In the alarm mode 90, the security controller has detected alarm conditions that set off alarms coupled to the processor 12. In this mode, the security telltale is active, the audible alarm is active, the visual alarm is active, the IGN_ENABLE line is inactive, and the STARTER line is inactive. The security controller remains in the alarm mode 90 until one of the conditions in Table G is met.

TABLE G a. The security controller remains in the alarm mode for greater than a predetermined period of time such as 30 seconds. In this case, the security function enters the rearm delay mode 92.
b. A valid remote arm command is received. In this case, the security function immediately cancels the alarm and enters the armed mode 86.
c. A valid remote disarm command is received. In this case, the security controller cancels the alarm and enters the standby mode 80.

In the rearm delay mode 92, the security controller determines whether alarm conditions are continuous in order to prevent nuisance alarms from occurring. In this way, if an alarm condition ceases to exist, the audible and visual alarms are deactivated. When in the rearm delay mode 92, the security telltale is active, the audible alarm is active, the visual alarm is inactive, the IGN—ENABLE line is inactive, and the STARTER line is inactive. The security controller remains in the rearm delay mode 92 until one of the conditions in Table H is met.

TABLE H a. The previous alarm mode 90 was entered as a result of vehicle motion and additional motion has occurred since the security controller was last disarmed. When this occurs, the security controller ignores additional changes in inclination until the security controller is disarmed and then rearmed.
b. The previous alarm mode 90 was entered as a result of an IGN input tampering and the LT_SW and RT_SW inputs were active during the alarm delay time. In this case, the security controller enters the personal code security mode 94.
c. The previous alarm mode 90 was entered as a result of IGN input tampering and ten violations have occurred since the security controller was last disarmed. The security controller ignores additional IGN input tampering until the security controller is disarmed and then rearmed. The security controller exits the rearm delay mode 90 for similar situations involving the IGN_ENABLE tampering and AUX_I/O tampering. The security controller operates in a similar manner for non-security telltale messages and battery connect/reconnect tampering.
d. The security controller remains in the rearm delay mode for a time greater than a predetermined period, such as ten (10) seconds. In this case, the security controller enters the armed mode 86.
e. The security controller receives a vehicle security intruder alarm message. In this case, the security controller enters the alarm mode 90.
f. A valid remote arm command is received from the transmitter. In this

TABLE H-continued case, the security controller enters the armed mode 86.
g. A valid remote disarm command is received. In this case, the security controller enters the standby mode 80.

As noted above, the security controller receives commands from transmitter 44 through the receiver 42. However, the security controller may operate in the personal code security mode 94 where the rider may input codes through the left and right turn signals switches 30 and 32. The personal code security mode allows a rider to disarm the security controller without a valid transmitter. In the personal code security mode 94, the security telltale is active, the audible alarm is inactive, the visual alarm is inactive, the IGN—ENABLE is inactive and the STARTER enable is inactive. The security controller remains in the personal code security mode 94 until an appropriate disarming procedure is successfully completed, in which case the security controller enters the standby mode 80. If the disarming procedure is not successfully completed, the security controller enters the alarm mode 90. If a valid remote arm or disarm command is received, the security controller enters the armed mode 86 or the standby mode 80, as the case may be.

To successfully disarm the security controller in the personal code security mode 94, the rider enters a personal code containing a predetermined number of digits. The personal code must have been previously programmed into the system, as will be described further herein. To enter the personal code security mode 94, the rider must move the ignition switch 16 to the ignition position I and then immediately to the accessory position A. This causes the security controller to enter the alarm mode 90. The rider then simultaneously activates the left and right turn signal switches 30 and 32, which causes the security controller to enter the personal code security mode 94. In this mode, the security controller flashes the security telltale and monitors the LT_SW and RT_SW lines. If no activity is detected for a timeout period, such as 30 seconds, the security controller returns to the alarm mode 90. If input is detected, the security controller determines whether that input matches the previously stored code.

The security controller is designed such that toggle inputs from the left turn signal switch 30 represent the digits of the personal code. Single toggle inputs from the right turn signal switch 32 are used to inform the security controller to process the toggle inputs from the left turn signal switch 30 as a digit. For example, to enter the code "321," the left turn signal switch 30 is depressed three times, then the right turn signal switch 32 is depressed once. The left turn signal switch 30 is then depressed two times, and the right turn signal switch 32 is depressed once. Finally, the left turn signal switch 30 is depressed once, and the right turn signal switch 32 is depressed once. If the proper code is entered, the security controller disarms the system and flashes the left and right turn signal lamps 50 and 52 for a security flash time, such as 100 ms.

As described, many of the features of the system 10 are dependent upon preprogrammed information input to the processor 12 during a programming mode. Before the processor may be placed in the programming mode, the security controller must be disarmed and the run/stop switch 18 must be in the stop position. Provided these conditions exist, the mode is entered following appropriate cycling of the ignition switch 16 and turn signal switches. In the embodiment described herein, cycling must occur according to the steps in Table I.

TABLE I

| Step No. | Action |
|---|---|
| 1 | Turn ignition switch from OFF to IGN |
| 2 | Cycle the ignition switch from IGN to OFF to IGN |
| 3 | Cycle the ignition switch again from IGN to OFF to IGN |
| 4 | Toggle the left turn signal switch from OFF to ON to OFF |
| 5 | Toggle the left turn signal switch again from OFF to ON to OFF. |

Once in the programming mode, the processor does not perform any of its other defined functions. The processor 12 remains in the programming mode until the ignition switch is turned to the OFF position.

While in the programming mode, a rider may customize the operation of certain features of the system 10. As noted above, the programming mode provides a mechanism for informing the processor 12 of the rider's personal code and whether a sidecar is installed on the vehicle. Other customizations may be accomplished through the programming mode, including modification of the alarm sensitivity, sign-up of the transmitter 44, the type of visual alarm provided by the system 10 (for example, a single, a double, or triple flashing), and the passive arming feature. Specifically, in the embodiment shown herein, features are customized using three groups: base level, security and immobilization, and personal code entry and verification. In the base level group, the RF transmitter sign-up, sidecar and service diagnostic features may be modified. In the security and immobilization group, tamper alarm sensitivity and passive arming may be modified. In the personal code entry and verification group, the personal code may be modified. Each feature may have an option. For example, the sidecar feature may have an "installed" option or a "not installed" option. The other features described above have similar options, which for the sake of brevity are not explained herein.

The processor 12 provides feedback to the rider to indicate the current customization groups, features, and options selected. This feedback consists of a number of turn signal flashes equal to the particular group, feature, or option. Customization of the system 10 is accomplished by selecting a customization group by activating one of the valid group control inputs. The activation of a control group input causes the processor to select a customization group associated with that input. Each time a new customization group is selected, the current feature selected is shown using the feedback described above. The next time a group control input is activated the next feature in that group is selected by the processor 12. If the processor 12 is in a particular customization group and detects a transition on the group control input for a different customization group, the processor transfers control to the new customization group after first storing the old customization group current settings. Generally, customization groups are selected using the right turn signal switch 32 and features within customization groups are selected using the left turn signal switch 30. The first time the left turn signal switch 30 is toggled for a newly selected feature, the current option is shown using the feedback described above. The next time the turn signal switch is toggled the next option is selected. The processor 12 stores the current settings for all customization groups in nonvolatile memory prior to exiting the programming mode.

As noted above, the security controller may control a battery backed siren 72. If implemented, it is preferred that the battery backed siren 72 take the form shown in FIG. 5.

Figure 5:
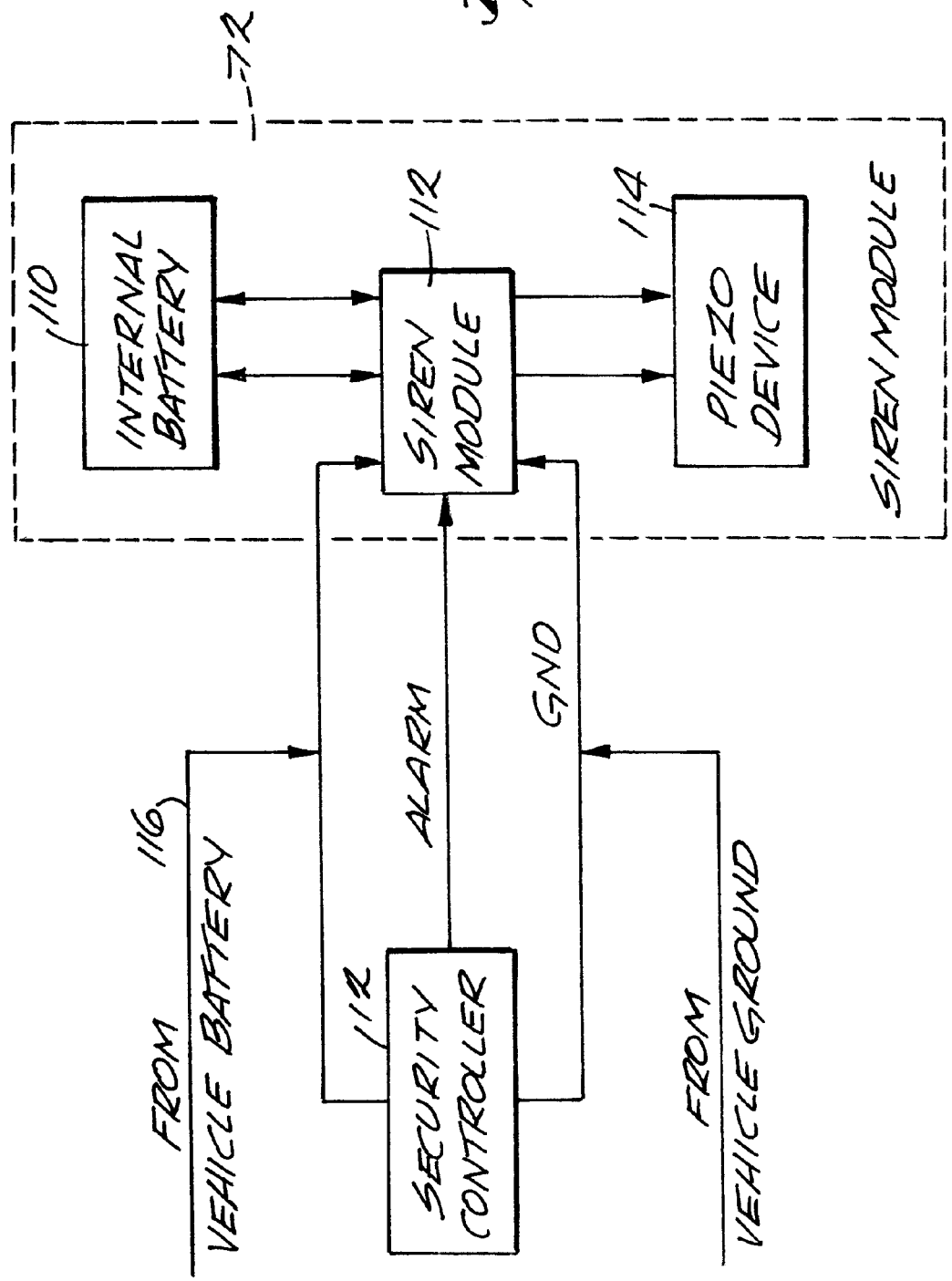
FIG. 5 is a block diagram of a battery-backed siren module embodying the invention.

As shown in FIG. 5, the battery backed siren 72 includes an internal battery 110, a siren module 112, and an audio device 114, such as a piezo-electric loudspeaker. The siren module 112 is powered by the battery 14 over a battery line 116. The siren module 112 uses power from the line 116 to recharge the internal battery 110, when the module is operating in a standby mode, and when the audio device 114 is activated by an input received over the ALARM line.

The siren module 112 may be in one of two states: an armed state and a disarmed state. The siren module 112 enters the armed state if a proper digital code or pulse sequence of a predetermined number of pulses is received over the ALARM line while the battery and ground connections to the vehicle are intact. If the number of pulses received is outside a specified or predetermined range, the siren module 112 retains its prior status. If the siren module 112 receives an appropriate pulse train, it produces an indication to verify that it has entered an armed state and provide a notification as to the status of the internal battery 110. Preferably, the siren module 112 produces two chirps when it has received an appropriate pulse train and the internal battery is installed. The siren module 112 produces three chirps when it has received an appropriate pulse train, but the internal battery has not been installed.

The siren module 112 is disarmed when it receives an appropriate pulse sequence such as ten pulses over the ALARM line while the battery and ground connections to the vehicle are intact. If an inappropriate pulse train is received, the siren module 112 remains in its previous status.

While in the armed state, the siren module 112 monitors all three input lines: the battery line 116, the ALARM line, and the ground input GND. In the armed state, the alarm device 114 is activated when the ALARM line input is held low for a period greater than a predetermined amount of time, such as 50 milliseconds. The siren module 112 deactivates the audio device 114 if the ALARM line signal is driven high by the security controller or the ALARM line signal is held low for longer than a predetermined time, such as 30 seconds.

One useful aspect of the battery backed siren 72 is that it self-activates the audio device 114 if a failure condition (which may indicate tampering) exists. For example, disconnection of the battery line 116, the ALARM line, or the ground line GND causes the siren module 112 to activate the audio device 114 in a cyclical manner for a predetermined amount of time. For example, the audio device 114 may be driven for 25 seconds followed by a 5 second interval of silence for a total of ten cycles.

As can be seen from the above, the present invention provides an integrated security, tip-over, and turn signal system that uses a single processor and has reduced wiring requirements, improved reliability, and enhanced features for rider safety and convenience. While various details and examples have been used to explain the invention, it is to be understood that the invention is not limited in its application to the description or illustration set forth herein. Rather, it is recognized that modifications may be made by one of ordinary skill in the art of the invention without departing from the spirit or intent of the invention and, therefore, the invention is to be taken as including all reasonable equivalents of the subject matter of the appended claims.

What is claimed is:

1. A system for a motorcycle having at least one turn signal lamp controlled by at least one turn signal switch and an engine, the system comprising:

an accelerometer for sensing lateral forces acting on the motorcycle and producing output signals; and a processor coupled to the accelerometer so that it receives the output signals of the accelerometer and capable of being coupled to the at least one turn signal switch to receive an input signal from the at least one turn signal switch, the processor including a turn signal controller operable to determine the beginning of a turn of the motorcycle based on a difference between a sensed lateral force and at least one output signal of the accelerometer when the motorcycle is moving in a straight direction for a predetermined amount of time and the end of the turn of the motorcycle based on a difference between a sensed bank angle and a current upright position of less than a predetermined amount for a predetermined period of time, and to turn off the at least one turn signal lamp a predefined period of time after the end of the turn.

2. A system as in claim 1, wherein the processor further includes a tip-over controller operable to turn off the vehicle engine and deactivate the turn signal lamp if the motorcycle is oriented in a predetermined manner.

3. A system as in claim 1, wherein the processor further includes a security controller that is operable to generate an alarm signal upon the occurrence of an alarm condition.

4. A system as in claim 3, wherein an alarm condition is vehicle motion, ignition tampering, or battery tampering.

5. A system as in claim 4, further comprising
a receiver operable to be activated after the receiver has received a signal from a transmitting device.

6. A system as in claim 5, wherein the security controller is operable to be de-activated after the receiver has received a second signal from a transmitting device.

7. In a motorcycle having an engine, at least one turn signal switch, and at least one turn signal lamp, the improvement comprising:

an accelerometer for sensing lateral forces acting on the motorcycle and producing an output signal;

a processor coupled to the accelerometer so that it receives the output signal of the accelerometer, the processor including a turn signal controller for receiving an input from the at least one turn signal switch, the turn-signal controller operable to turn the at least one turn signal lamp off after counting a predetermined and programmed number of actions, and to suspend counting of the actions based on the lateral forces acting on the motorcycle while the speed and acceleration of the motorcycle are within a predetermined range of speed and acceleration criteria; and a tip-over controller operable to turn off the motorcycle engine and deactivate the at least one turn signal lamp if the motorcycle is oriented in a predetermined manner.

8. A system as in claim 7, wherein the motorcycle includes a starter and the tip-over controller is operable to deactivate the starter.

9. A system as in claim 7, wherein the processor further includes a security controller that is operable to generate an alarm signal upon the occurrence of an alarm condition.

10. A system as in claim 9, wherein an alarm condition is vehicle motion, ignition tampering, or battery tampering.

11. A system as in claim 9, further comprising
a receiver for receiving signals from a transmitting device; and wherein the security controller is operable to be activated after the receiver has received a signal from the transmitting device.

12. A system as in claim 11, wherein the security controller is operable to be de-activated after the receiver has received a second signal from the transmitting device.

13. A system as in claim 9, wherein the security controller is activated after a predetermined amount of time has elapsed following engine shut-off.

14. A system for a motorcycle having a plurality of pairs of turn signal lamps, each pair of lamps controlled by a turn signal switch, and an engine, the system comprising:

an accelerometer for sensing lateral forces and producing output signals; and a processor coupled to the accelerometer so that it receives the output signals of the accelerometer, the processor including a turn-signal controller for receiving input from the turn signal switches, the turn signal controller operable to keep one pair of turn signal lamps on for a predetermined and programmed number of turn signal flashes after receiving an input from one of the turn signal switches, and to calculate the beginning of a turn of the motorcycle based on a difference between a sensed lateral force and at least one output signal of the accelerometer when the motorcycle is moving in a straight direction for a predetermined amount of time and the end of a turn of the motorcycle based on a difference between a sensed bank angle and a current upright position of less than a predetermined amount for a predetermined period of time and turn off the one pair of turn signal lamps controlled by the one of the turn signal switches at the end of a turn prior to the the one pair of turn signal lamps flashing for the predetermined number of flashes.

15. A system as in claim 14, wherein the processor further comprises a tip-over controller operable to turn off the vehicle engine and deactivate the turn signal lamps if the inclination of the motorcycle reaches a predetermined amount.

16. A system as in claim 14, wherein the processor further comprises a security controller that generates an alarm signal upon the occurrence of an alarm condition.

17. A system as in claim 16, wherein the system includes a security telltale and the processor includes an input that receives information from both the security telltale and an auxiliary device.

18. A system as in claim 16, wherein the system includes a siren coupled to the processor to receive the alarm signal from the security controller.

19. A system as in claim 16, wherein the system includes a pager coupled to the processor to receive the alarm signal from the security controller.

20. A system as in claim 16, wherein the system includes a battery backed siren coupled to the processor to receive the alarm signal from the security controller.

21. A system as in claim 16, wherein an alarm condition is vehicle motion, ignition tampering, or battery tampering.

22. A system as in claim 16, further comprising
a receiver for receiving a signal from a transmitting device; and wherein the security controller is operable to be activated after the receiver has received a signal from the transmitting device.

23. A system as in claim 22, wherein the security controller is operable to be activated after the receiver has received a signal from the transmitting device.

24. A system as in claim 16, wherein the security controller is operable to be deactivated by a signal input to the processor from the turn signal switches.

25. A system as in claim 14, wherein the processor is programmed to automatically detect and configure the system according to whether the motorcycle is a bus-equipped or non-bus-equipped vehicle.

26. A system for a motorcycle having an engine, a plurality of turn signal lamps, and a plurality of turn signal switches, the improvement comprising:

an accelerometer for sensing lateral forces and producing an output signal;
a processor coupled to the accelerometer so that it receives the output signal of the accelerometer, the processor including
a turn signal controller for receiving input from the turn signal switches, the turn signal controller operable to keep one or more of the turn signal lamps on for a predetermined amount of time after receiving an input from one of the turn signal switches; and
a tip-over controller having a predefined tip angle, the tip-over controller operable to determine a lean angle based on information from the accelerometer and to turn off the motorcycle engine and deactivate the turn signal lamps if the lean angle is equal to or greater than the tip angle for a predetermined period of time.

27. A system as in claim 26, wherein the motorcycle includes a sidecar and the processor is operable to disable the tip-over controller based on input from the turn signal switches indicating the presence of the sidecar.

28. A system as in claim 26, wherein the processor further includes a security controller that is operable to generate an alarm signal upon the occurrence of an alarm condition.

29. A system as in claim 28, wherein the system further includes a starter and the security controller is operable to disable the starter upon the occurrence of an alarm condition.

30. A system as in claim 28, wherein the system further includes an ignition module and the security controller is operable to disable the ignition module by sending it a digital code upon the occurrence of an alarm condition.

31. A system as in claim 28, wherein the turn-signal controller is operable to calculate the beginning of a turn of the motorcycle and the end of a turn of the motorcycle based on the sensed lateral forces and turn off one or more of the turn signal lamps at the end of a turn.

32. A system for a motorcycle having a plurality of turn signal lamps controlled by at least two turn signal switches, the system comprising:

a processor capable of being mounted on the motorcycle and including
a turn signal controller for receiving an input from each turn-signal switch, the turn signal controller operable to turn on at least some of the plurality of turn signal lamps when at least one of the at least two turn signal switches produces an output and a security controller operable in an armed mode, a disarmed mode, and a personal security mode, and wherein the security controller disables the engine and enables the plurality of turn signal lamps when in the armed mode and enters the disarmed mode if a proper security code is entered into the security controller via at least one of the two turn signal switches when the security controller is in the personal security mode.

33. A system for a motorcycle having an engine and at least one turn signal lamp controlled by at least one turn signal switch, the system comprising:

an accelerometer for sensing lateral forces acting on the motorcycle and producing an output signal; and
a processor capable of being mounted on the motorcycle and coupled to the accelerometer and to the at least one turn signal lamp, the processor operable in multiple modes, including an off mode, an accessory mode, an ignition stop mode, and an ignition run mode, and having
a tip-over controller for sensing a tip over condition and upon sensing such a condition disabling the at least one turn signal lamp, the tip-over controller operable to re-enable the turn signal lamp after it is disabled when the processor transitions from one to another of the multiple modes.

34. A system for a motorcycle having an engine and at least one turn signal switch, the system comprising:

an accelerometer operable to sense lateral forces acting on the motorcycle and to produce an output signal;
a processor capable of being mounted on the motorcycle, coupled to the accelerometer, and coupled to the at least one turn signal switch, the processor including
a security controller having at least three modes including an armed model, a disarmed mode, and a mode between the armed mode and the disarmed mode, the security controller operable to detect motion of the motorcycle based on output of the accelerometer when in the armed mode and to generate an alarm signal upon the occurrence of such motion, the security controller operable to be set in the disarmed mode in a first manner using input from the at least one turn signal switch and a second manner using input from a device coupled in wireless communication to the security controller, and wherein the security controller disables the engine when in the armed mode.

35. A system for a motorcycle having at least one turn signal lamp controlled by at least one turn signal switch, the system comprising:

a processor capable of being mounted on the motorcycle and coupled to the at least one turn signal switch, the processor including
a turn signal controller operable to determine the beginning of a turn of the motorcycle and the end of the turn of the motorcycle and to turn off the at least one turn signal lamp a predefined period of time after the end of the turn;
a tip-over controller having a number of programmable features and a predefined tip angle, the tip-over controller operable to determine a lean angle based on information from the accelerometer and to turn off the motorcycle engine and deactivate the turn signal lamps if the lean angle is equal to or greater than the tip angle for a predetermined period of time; and
a security controller having at a number of programmable features and at least three modes including an armed mode, a disarmed mode, and a mode between the armed mode and the disarmed mode, the security controller operable to detect motion of the motorcycle based on output of the accelerometer when in the armed mode and to generate an alarm signal upon the occurrence of such motion,
wherein the programmable features of the tip-over controller and the security controller may be programmed based on input from the turn signal switch.

36. A system for a motorcycle having at least one turn signal lamp controlled by at least one turn signal switch and an engine, the system comprising:

an accelerometer operable to sense lateral forces acting on the motorcycle and to produce output signals; and a processor coupled to the accelerometer so that it receives the output signals of the accelerometer and connectable to the turn signal switch, the processor including a turn signal controller operable to determine the beginning of a turn of the motorcycle based on a difference between a sensed lateral force and at least one output signal of the accelerometer when the motorcycle is moving in a straight direction for a predetermined amount of time and the end of the turn of the motorcycle based on a difference between a sensed bank angle and a current upright position of less than a predetermined amount for a predetermined period of time, and to turn off the at least one turn signal lamp a predefined period of time after the end of the turn;

a tip-over controller having a predefined tip angle, the tip-over controller operable to determine a lean angle based on information from the accelerometer and to turn off the motorcycle engine and deactivate the turn signal lamps if the lean angle is equal to or greater than the tip angle for a predetermined period of time; and a security controller having at least three modes including an armed mode, a disarmed mode, and a mode between the armed mode and the disarmed mode, the security controller operable to detect motion of the motorcycle based on output of the accelerometer when in the armed mode and to generate an alarm signal upon the occurrence of such motion, the security controller operable to be set in the disarmed mode in a first manner using input from the at least one turn signal switch and a second manner using input from a device coupled in wireless communication to the security controller.

* * * * *

UNITED STATES PATENT AND TRADEMARK OFFICE
Certificate

Patent No. 6,268,794 B1                                      Patented: July 31, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Oleg Tzanev, Waukesha, WI; Michael W. Johnson, Wauwatosa, WI; and Dale W. Markowski, El Paso, TX.

Signed and Sealed this Twenty-fifth Day of October 2005.

*JEFFERY A. HOFSASS*
*Supervisory Patent Examiner*
Art Unit 2636